(12) United States Patent
Son et al.

(10) Patent No.: US 11,548,139 B2
(45) Date of Patent: Jan. 10, 2023

(54) ROBOT

(71) Applicant: LG ELECTRONICS INC., Seoul (KR)

(72) Inventors: Jungkyu Son, Seoul (KR); Jinsu Kim, Seoul (KR); Boyeon Kim, Seoul (KR); Hyesun Lee, Seoul (KR); Bina Kim, Seoul (KR); Mina Suh, Seoul (KR); Jinwon Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 392 days.

(21) Appl. No.: 16/804,613

(22) Filed: Feb. 28, 2020

(65) Prior Publication Data

US 2021/0138632 A1 May 13, 2021

(30) Foreign Application Priority Data

Nov. 11, 2019 (KR) ........................ 10-2019-0143246

(51) Int. Cl.
| | | |
|---|---|---|
| *B25J 5/00* | (2006.01) | |
| *B25J 9/00* | (2006.01) | |
| *A61G 5/10* | (2006.01) | |
| *B25J 11/00* | (2006.01) | |
| *A61G 5/04* | (2013.01) | |

(52) U.S. Cl.
CPC ............ *B25J 5/007* (2013.01); *B25J 9/0009* (2013.01); *A61G 5/04* (2013.01); *A61G 5/10* (2013.01); *B25J 11/009* (2013.01)

(58) Field of Classification Search
CPC .......... B25J 5/007; B25J 11/009; A61G 5/04; A61G 5/10; A61G 5/1094
See application file for complete search history.

(56) References Cited

U.S. PATENT DOCUMENTS

2016/0101664 A1* 4/2016 Richter ................ A61G 5/1081
701/49
2018/0014988 A1* 1/2018 Diaz-Flores ........... A61G 5/023

FOREIGN PATENT DOCUMENTS

| KR | 10-0870537 B1 | 11/2008 | |
| WO | WO-2016199312 A1 * | 12/2016 | ............... A61G 5/04 |

* cited by examiner

*Primary Examiner* — Randell J Krug
(74) *Attorney, Agent, or Firm* — Birch, Stewart, Kolasch & Birch, LLP

(57) ABSTRACT

Provided is a robot including a main body provided with a pair of traveling wheels that are spaced apart from each other in a horizontal direction, a seating body disposed above the main body, a foot supporter disposed on a front lower portion of the main body, at least one front wheel disposed on the foot supporter, and a rear wheel disposed on the main body so as to be closer to a rear end of the main body than a front end of the main body and the traveling wheel is closer to the front end of the main body than the rear end of the main body.

17 Claims, 12 Drawing Sheets

ROBOT

CROSS-REFERENCE TO RELATED APPLICATIONS

This application claims the benefit of priority to Korean Patent Application No. 10-2019-0143246, filed on Nov. 11, 2019 in the Korean Intellectual Property Office, the disclosure of which is incorporated herein by reference in its entirety.

FIELD OF THE DISCLOSURE

The present invention relates to a robot.

Robots are machines that automatically process given tasks or operate with their own capabilities. The application fields of robots are generally classified into industrial robots, medical robots, aerospace robots, and underwater robots. Recently, communication robots that can communicate with humans by voices or gestures have been increasing.

In recent years, there has been a trend of increasing in number of guidance robots, which provide a variety of guidance services at the airport, government offices, etc., a transport robot for transporting goods, or a boarding robot on which the user boards.

The robot may be provided with a wheel assembly for allowing the robot main body (or main body) to move and may include at least one driving wheel and at least one auxiliary wheel.

An example of a robot having a driving wheel and an auxiliary wheel includes a wheel assembly for a robot, which is disclosed in Korea Patent Publication No. 10-0870537 (Published on Nov. 26, 2008). The wheel assembly for the robot includes a pair of supporters coupled to a lower side of a robot body, a frame rotatably supported on the supporters, a pair of driving wheels rotatably coupled around a rotation axis parallel to a rotation axis of the frame at a rear side of the rotation axis of the frame, a first auxiliary wheel rotatably coupled around the rotation axis parallel to the rotation axis of the driving wheel in front of the rotation axis of the frame, a second auxiliary wheel rotatably coupled to a lower rear side of the robot body, and a support shaft connecting the pair of supporters to each other. The frame is supported on a pair of supporters.

SUMMARY

Embodiments provide a robot on which a passenger comfortably boards and which is capable of smoothly and stably rotating in a narrow space.

Embodiments also provide a robot in which a radius of rotation is capable of being minimized, and a rear portion is capable of being stably supported.

In an embodiment, a robot includes: a main body provided with a pair of traveling wheels that are spaced apart from each other in a left-right (i.e., horizontal direction); a seating body disposed above the main body; a foot supporter disposed on a front lower portion of the main body; at least one front wheel disposed on the foot supporter; and a rear wheel disposed on the main body so as to be closer to a rear end of the main body than a front end of the main body, wherein the traveling wheel is closer to the front end of the main body than the rear end of the main body.

The front wheel may be provided in a pair, which are spaced apart from each other in the horizontal direction, on the foot supporter. A distance between the pair of traveling wheels may be less than a distance between the pair of front wheels.

At least one of the front wheel or the rear wheel may include an omnidirectional wheel, or "omni" wheel.

Each of the front wheel and the rear wheel may include a pair of omni wheel assembles, and each of the pair of omni wheel assembles may include: a main wheel having a rotation center axis parallel to a rotation center axis of the traveling wheel; and a plurality of barrels disposed on an outer circumference of the main wheel, the plurality of barrels rotating about a rotation center axis in a direction different from the rotation center axis of the main wheel.

The traveling wheel may have a diameter greater than a diameter of the front wheel.

The traveling wheel may have a diameter greater than a diameter of the rear wheel.

The front wheel and the rear wheel may have the same diameter.

Each of the front wheel and the rear wheel may have a thickness greater than a thickness of the traveling wheel.

When the foot supporter maximally advances, a distance between the traveling wheel and the front wheel may be farther than a distance between the traveling wheel and the rear wheel.

A distance between a virtual line, which equally divides the main body in a left-right direction, and the traveling wheel may be farther than a distance between the traveling wheel and a side end of the main body.

The rear wheel may be disposed between a virtual line, which equally devices the main body in a front and rear direction, and a rear end of the main body.

The rear wheel may be disposed in a virtual line that equally divides the main body in a left-right direction.

The main body may include a lower plate which is configured to guide forward and backward movement of the foot supporter and on which the rear wheel is rotatably disposed.

A traveling wheel through-hole through which the traveling wheel passes may be defined in the lower plate.

The robot may further include: a foot supporter mover disposed on the lower plate to allow the foot supporter to move in the front-rear direction (i.e., longitudinal direction); a pair of traveling motor configured to drive the pair of traveling wheels; and a processor configured to control the foot supporter mover and the pair of traveling motor.

The foot supporter mover may include: a motor mounted on the lower plate; a screw connected to the motor; and a carrier moving along the screw and connected to the foot supporter.

In another embodiment, a robot includes: a main body provided with a pair of traveling wheels that are spaced apart from each other in a horizontal direction; a pair of traveling motors configured to allow the pair of traveling wheels to rotate; a seating body disposed above the main body; a foot supporter disposed on a front lower portion of the main body; a pair of front wheels disposed on the foot supporter, the pair of front wheels being spaced apart from each other in a horizontal direction; and a rear wheel disposed on the main body so as to be closer to a rear end of the main body than a front end of the main body, wherein each of the front wheel and the rear wheel comprises an omni wheel. A rotation center of the robot may be disposed between the pair of traveling wheels, and the seating body may be disposed at the rotation center. A rotation radius of the robot may be a distance between the rotation center and a front end of the foot supporter.

The traveling wheel may have a diameter greater than a diameter of each of the front wheel and the rear wheel, and the traveling wheel may have a thickness less than a thickness of each of the front wheel and the rear wheel. When the foot supporter maximally advances, a distance between the traveling wheel and the front wheel may be farther than a distance between the traveling wheel and the rear wheel.

The rear wheel may be disposed between a first virtual line, which equally divides the main body in a front and rear direction, and a rear end of the main body and be disposed in a second virtual that equally divides the main body in a left-right direction.

The details of one or more embodiments are set forth in the accompanying drawings and the description below. Other features will be apparent from the description and drawings, and from the claims.

DETAILED DESCRIPTION OF THE EMBODIMENTS

Figure 1:
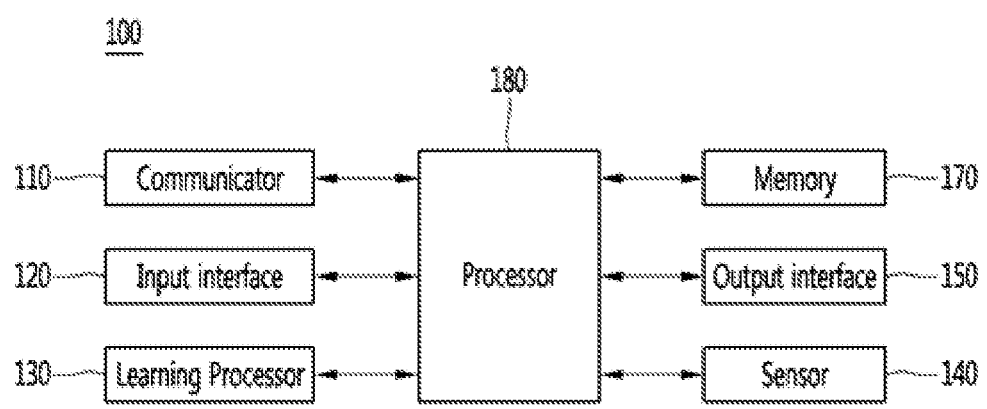
FIG. 1 is a view illustrating an AI device constituting a robot system according to an embodiment.

Hereinafter, detailed embodiments will be described in detail with reference to the accompanying drawings.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

<Artificial Intelligence (AI)>

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for learning data is given, and the label may mean the correct answer (or result value) that the artificial neural network must infer when the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

<Self-Driving>

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

At this time, the self-driving vehicle may be regarded as a robot having a self-driving function.

FIG. 1 illustrates an AI device 100 including a robot according to an embodiment of the present invention.

The AI device 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 100 may include a communicator 110, an input interface 120, a learning processor 130, a sensor 140, an output interface 150, a memory 170, and a processor 180.

The communicator 110 may transmit and receive data to and from external devices such as other AI devices 100a to 100e and the AI server 500 by using wire/wireless communication technology. For example, the communicator 110 may transmit and receive sensor information, a user input, a learning model, and a control signal to and from external devices.

The communication technology used by the communicator 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input interface 120 may acquire various kinds of data.

At this time, the input interface 120 may include a camera for inputting a video signal, a microphone for receiving an audio signal, and a user input interface for receiving information from a user. The camera or the microphone may be treated as a sensor, and the signal acquired from the camera or the microphone may be referred to as sensing data or sensor information.

The input interface 120 may acquire a learning data for model learning and an input data to be used when an output is acquired by using learning model. The input interface 120 may acquire raw input data. In this case, the processor 180 or the learning processor 130 may extract an input feature by preprocessing the input data.

The learning processor 130 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

At this time, the learning processor 130 may perform AI processing together with the learning processor 540 of the AI server 500.

At this time, the learning processor 130 may include a memory integrated or implemented in the AI device 100. Alternatively, the learning processor 130 may be implemented by using the memory 170, an external memory directly connected to the AI device 100, or a memory held in an external device.

The sensor 140 may acquire at least one of internal information about the AI device 100, ambient environment information about the AI device 100, and user information by using various sensors.

Examples of the sensors included in the sensor 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output interface 150 may generate an output related to a visual sense, an auditory sense, or a haptic sense.

At this time, the output interface 150 may include a display unit for outputting time information, a speaker for outputting auditory information, and a haptic module for outputting haptic information.

The memory 170 may store data that supports various functions of the AI device 100. For example, the memory 170 may store input data acquired by the input interface 120, learning data, a learning model, a learning history, and the like.

The processor 180 may determine at least one executable operation of the AI device 100 based on information determined or generated by using a data analysis algorithm or a machine learning algorithm. The processor 180 may control the components of the AI device 100 to execute the determined operation.

To this end, the processor 180 may request, search, receive, or utilize data of the learning processor 130 or the memory 170. The processor 180 may control the components of the AI device 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 540 of the AI server 500, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 500. The collected history information may be used to update the learning model.

The processor 180 may control at least part of the components of AI device 100 so as to drive an application program stored in memory 170. Furthermore, the processor 180 may operate two or more of the components included in the AI device 100 in combination so as to drive the application program.

Figure 2:
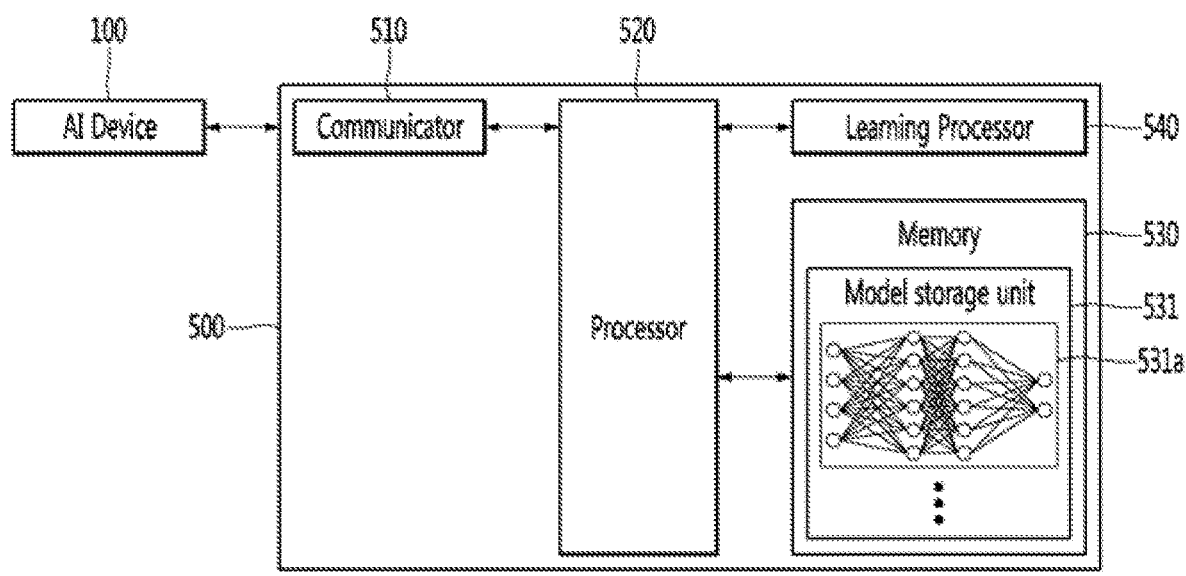
FIG. 2 is a view illustrating an AI server of a robot system according to an embodiment.

FIG. 2 illustrates an AI server 500 connected to a robot according to an embodiment of the present invention.

Referring to FIG. 2, the AI server 500 may refer to a device that learns an artificial neural network by using a machine learning algorithm or uses a learned artificial neural network. The AI server 500 may include a plurality of servers to perform distributed processing, or may be defined as a 5G network. At this time, the AI server 500 may be included as a partial configuration of the AI device 100, and may perform at least part of the AI processing together.

The AI server 500 may include a communicator 510, a memory 530, a learning processor 540, a processor 520, and the like.

The communicator 510 can transmit and receive data to and from an external device such as the AI device 100.

The memory 530 may include a model storage unit 531. The model storage unit 531 may store a learning or learned model (or an artificial neural network 531a) through the learning processor 540.

The learning processor 540 may learn the artificial neural network 531a by using the learning data. The learning model may be used in a state of being mounted on the AI server 500 of the artificial neural network, or may be used in a state of being mounted on an external device such as the AI device 100.

The learning model may be implemented in hardware, software, or a combination of hardware and software. If all or part of the learning models are implemented in software, one or more instructions that constitute the learning model may be stored in memory 530.

The processor 520 may infer the result value for new input data by using the learning model and may generate a response or a control command based on the inferred result value.

Figure 3:
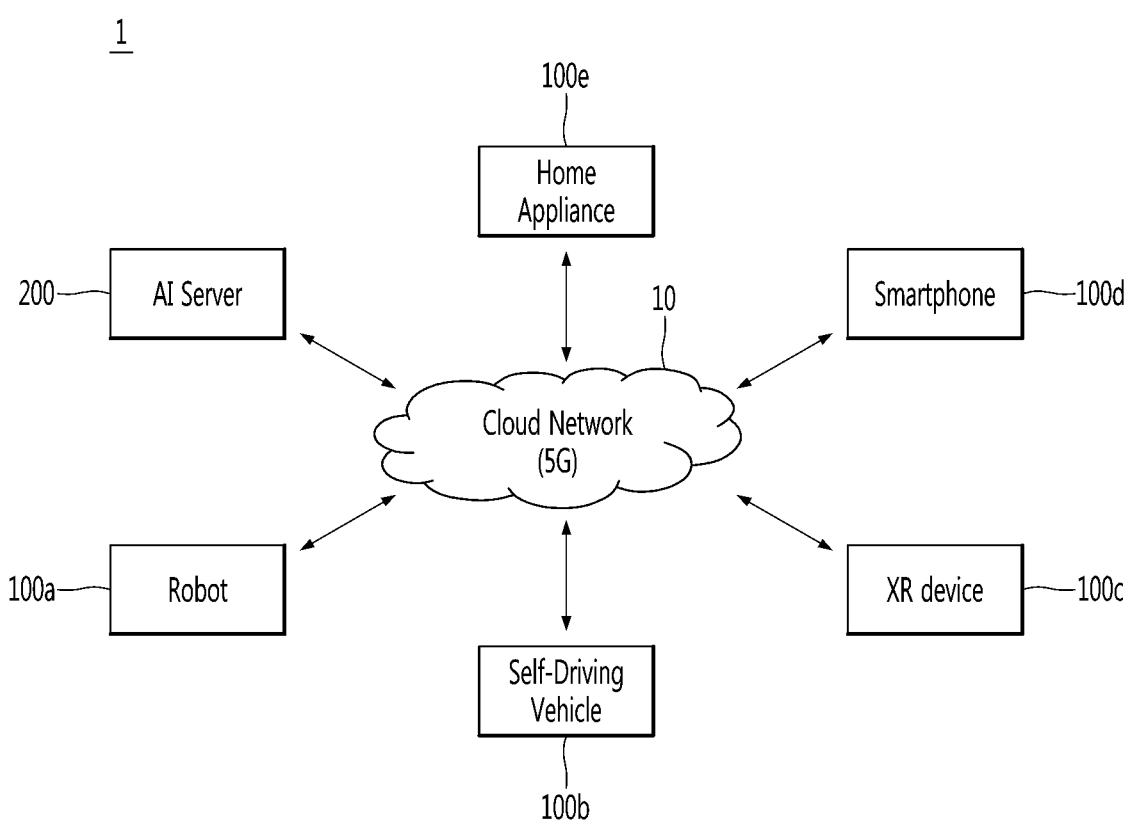
FIG. 3 is a view illustrating an AI system to which a robot system according to an embodiment is applied.

FIG. 3 illustrates an AI system 1 according to an embodiment of the present invention.

Referring to FIG. 3, in the AI system 1, at least one of an AI server 500, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, may be referred to as AI devices 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100a to 100e and 500 configuring the AI system 1 may be connected to each other through the cloud network 10. In particular, each of the devices 100a to 100e and 500 may communicate with each other through a base station, but may directly communicate with each other without using a base station.

The AI server 500 may include a server that performs AI processing and a server that performs operations on big data.

The AI server 500 may be connected to at least one of the AI devices constituting the AI system 1, that is, the robot 100a, the self-driving vehicle 100b, the XR device 100c, the smartphone 100d, or the home appliance 100e through the cloud network 10, and may assist at least part of AI processing of the connected AI devices 100a to 100e.

At this time, the AI server 500 may learn the artificial neural network according to the machine learning algorithm instead of the AI devices 100a to 100e, and may directly store the learning model or transmit the learning model to the AI devices 100a to 100e.

At this time, the AI server 500 may receive input data from the AI devices 100a to 100e, may infer the result value for the received input data by using the learning model, may generate a response or a control command based on the inferred result value, and may transmit the response or the control command to the AI devices 100a to 100e.

Alternatively, the AI devices 100a to 100e may infer the result value for the input data by directly using the learning model, and may generate the response or the control command based on the inference result.

Hereinafter, various embodiments of the AI devices 100a to 100e to which the above-described technology is applied will be described. The AI devices 100a to 100e illustrated in FIG. 3 may be regarded as a specific embodiment of the AI device 100 illustrated in FIG. 1.

<AI+Robot>

The robot 100a, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the route and the travel plan, may determine the response to user interaction, or may determine the operation.

The robot 100a may use the sensor information acquired from at least one sensor among the lidar, the radar, and the camera so as to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 500.

At this time, the robot 100a may perform the operation by generating the result by directly using the learning model, but the sensor information may be transmitted to the external device such as the AI server 500 and the generated result may be received to perform the operation.

The robot 100a may use at least one of the map data, the object information detected from the sensor information, or the object information acquired from the external apparatus to determine the travel route and the travel plan, and may control the driving unit such that the robot 100a travels along the determined travel route and travel plan.

The map data may include object identification information about various objects arranged in the space in which the robot 100a moves. For example, the map data may include object identification information about fixed objects such as walls and doors and movable objects such as pollen and desks. The object identification information may include a name, a type, a distance, and a position.

In addition, the robot 100a may perform the operation or travel by controlling the driving unit based on the control/interaction of the user. At this time, the robot 100a may acquire the intention information of the interaction due to the user's operation or speech utterance, and may determine the response based on the acquired intention information, and may perform the operation.

<AI+Robot+Self-Driving>

The robot 100a, to which the AI technology and the self-driving technology are applied, may be implemented as a guide robot, a carrying robot, a cleaning robot, a wearable robot, an entertainment robot, a pet robot, an unmanned flying robot, or the like.

The robot 100a, to which the AI technology and the self-driving technology are applied, may refer to the robot itself having the self-driving function or the robot 100a interacting with the self-driving vehicle 100b.

The robot 100a having the self-driving function may collectively refer to a device that moves for itself along the given movement line without the user's control or moves for itself by determining the movement line by itself.

The robot 100a and the self-driving vehicle 100b having the self-driving function may use a common sensing method so as to determine at least one of the travel route or the travel plan. For example, the robot 100a and the self-driving vehicle 100b having the self-driving function may determine at least one of the travel route or the travel plan by using the information sensed through the lidar, the radar, and the camera.

The robot 100a that interacts with the self-driving vehicle 100b exists separately from the self-driving vehicle 100b and may perform operations interworking with the self-driving function of the self-driving vehicle 100b or interworking with the user who rides on the self-driving vehicle 100b.

At this time, the robot 100a interacting with the self-driving vehicle 100b may control or assist the self-driving function of the self-driving vehicle 100b by acquiring sensor information on behalf of the self-driving vehicle 100b and providing the sensor information to the self-driving vehicle 100b, or by acquiring sensor information, generating environment information or object information, and providing the information to the self-driving vehicle 100b.

Alternatively, the robot 100a interacting with the self-driving vehicle 100b may monitor the user boarding the self-driving vehicle 100b, or may control the function of the self-driving vehicle 100b through the interaction with the user. For example, when it is determined that the driver is in a drowsy state, the robot 100a may activate the self-driving function of the self-driving vehicle 100b or assist the control of the driving unit of the self-driving vehicle 100b. The function of the self-driving vehicle 100b controlled by the robot 100a may include not only the self-driving function but also the function provided by the navigation system or the audio system provided in the self-driving vehicle 100b.

Alternatively, the robot 100a that interacts with the self-driving vehicle 100b may provide information or assist the function to the self-driving vehicle 100b outside the self-driving vehicle 100b. For example, the robot 100a may provide traffic information including signal information and the like, such as a smart signal, to the self-driving vehicle 100b, and automatically connect an electric charger to a charging port by interacting with the self-driving vehicle 100b like an automatic electric charger of an electric vehicle.

Hereinafter, the robot 100a will be described as an example of the boarding robot on which the user is capable of boarding.

Figure 4:
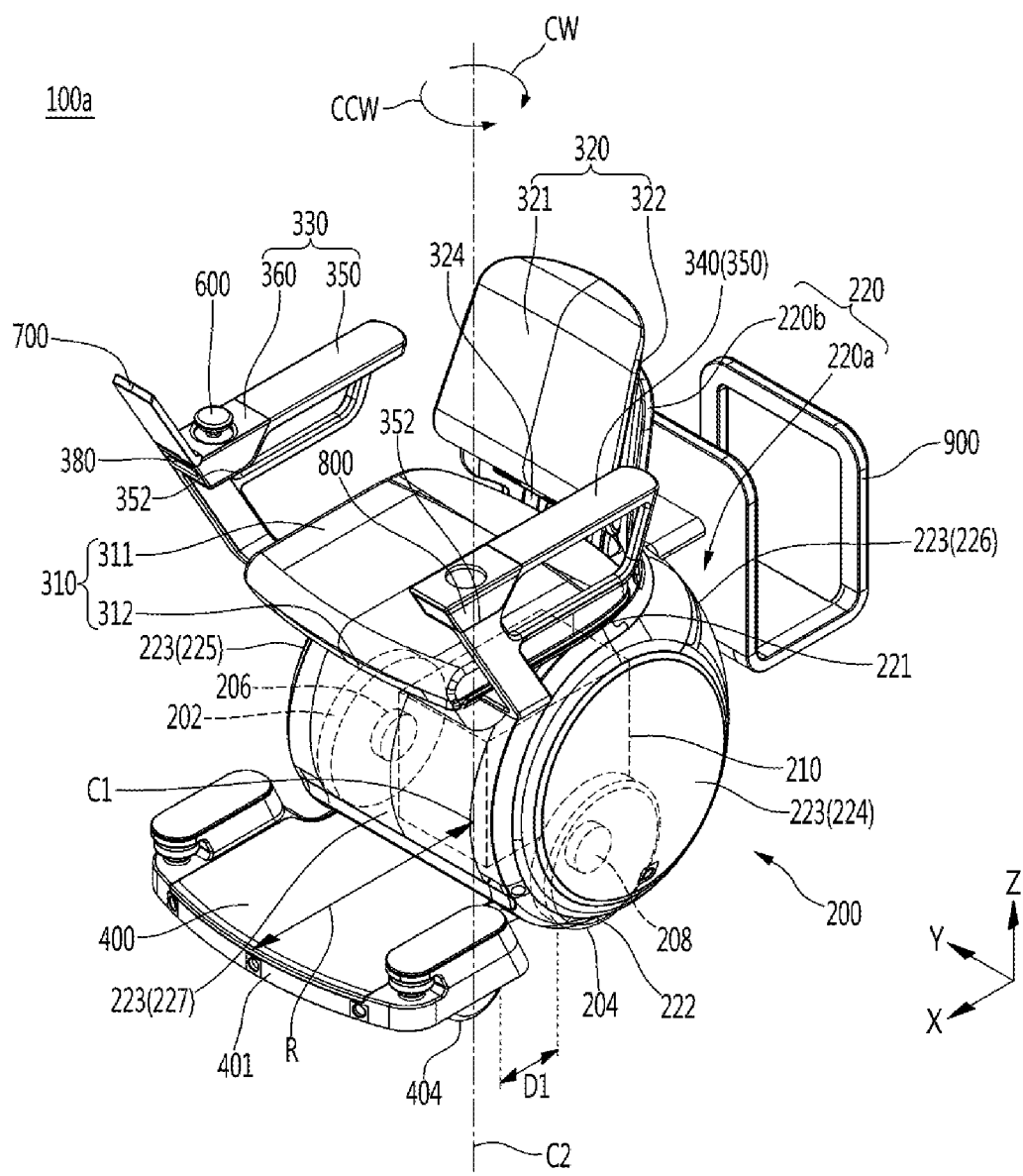
FIG. 4 is a perspective view of a robot according to an embodiment.
Figure 5:
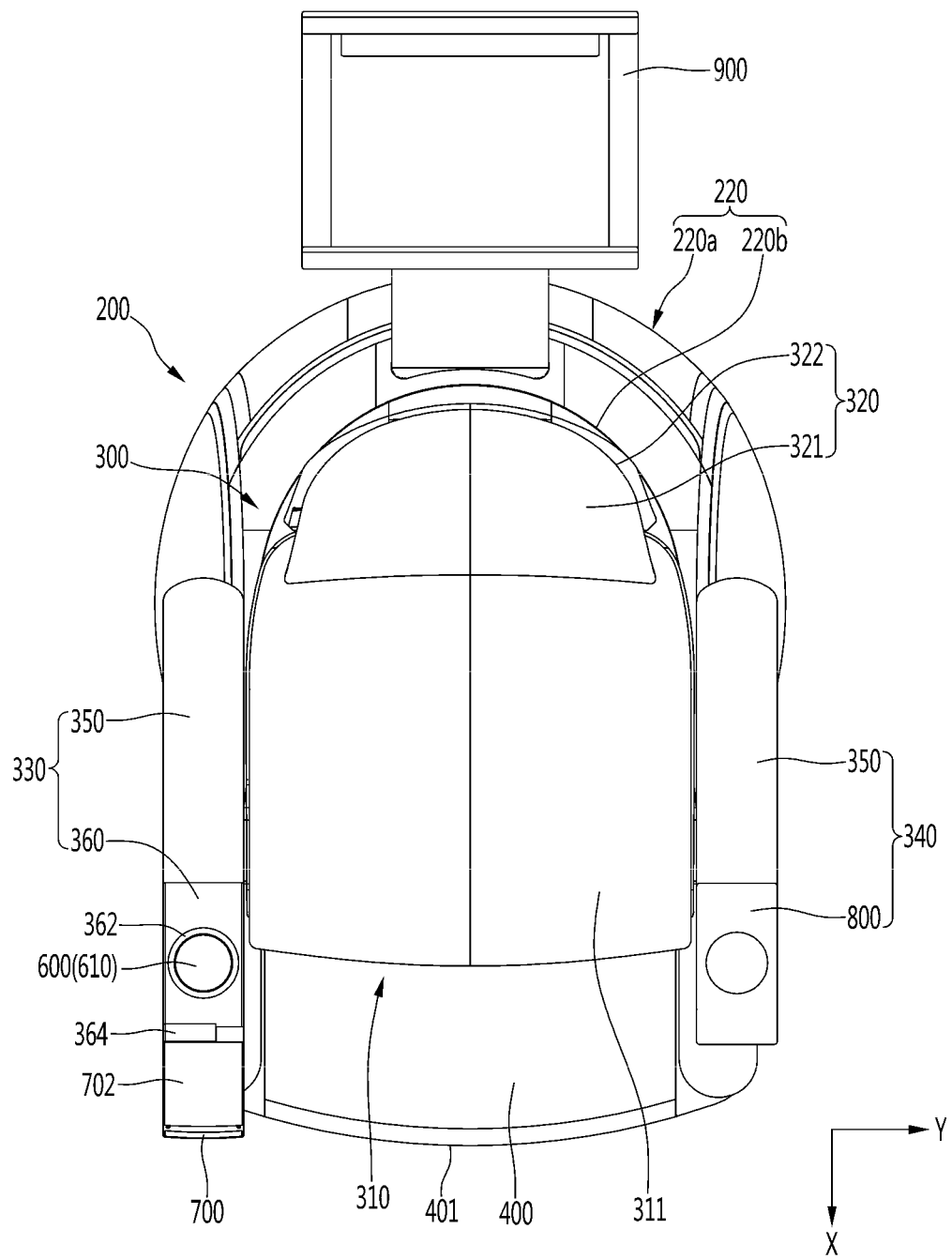
FIG. 5 is a plan view of the robot according to an embodiment.
Figure 6:
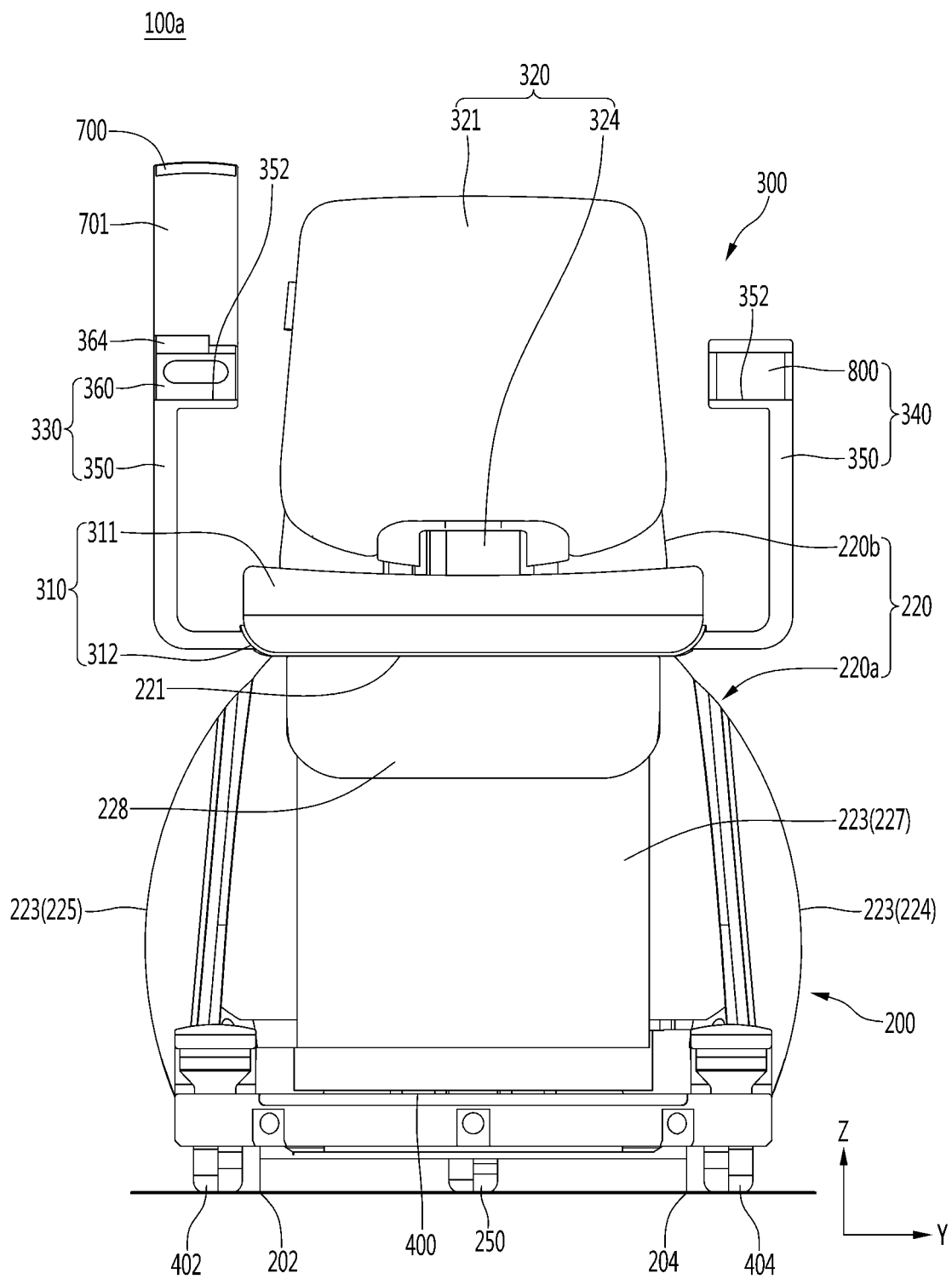
FIG. 6 is a front view of the robot according to an embodiment.
Figure 7:
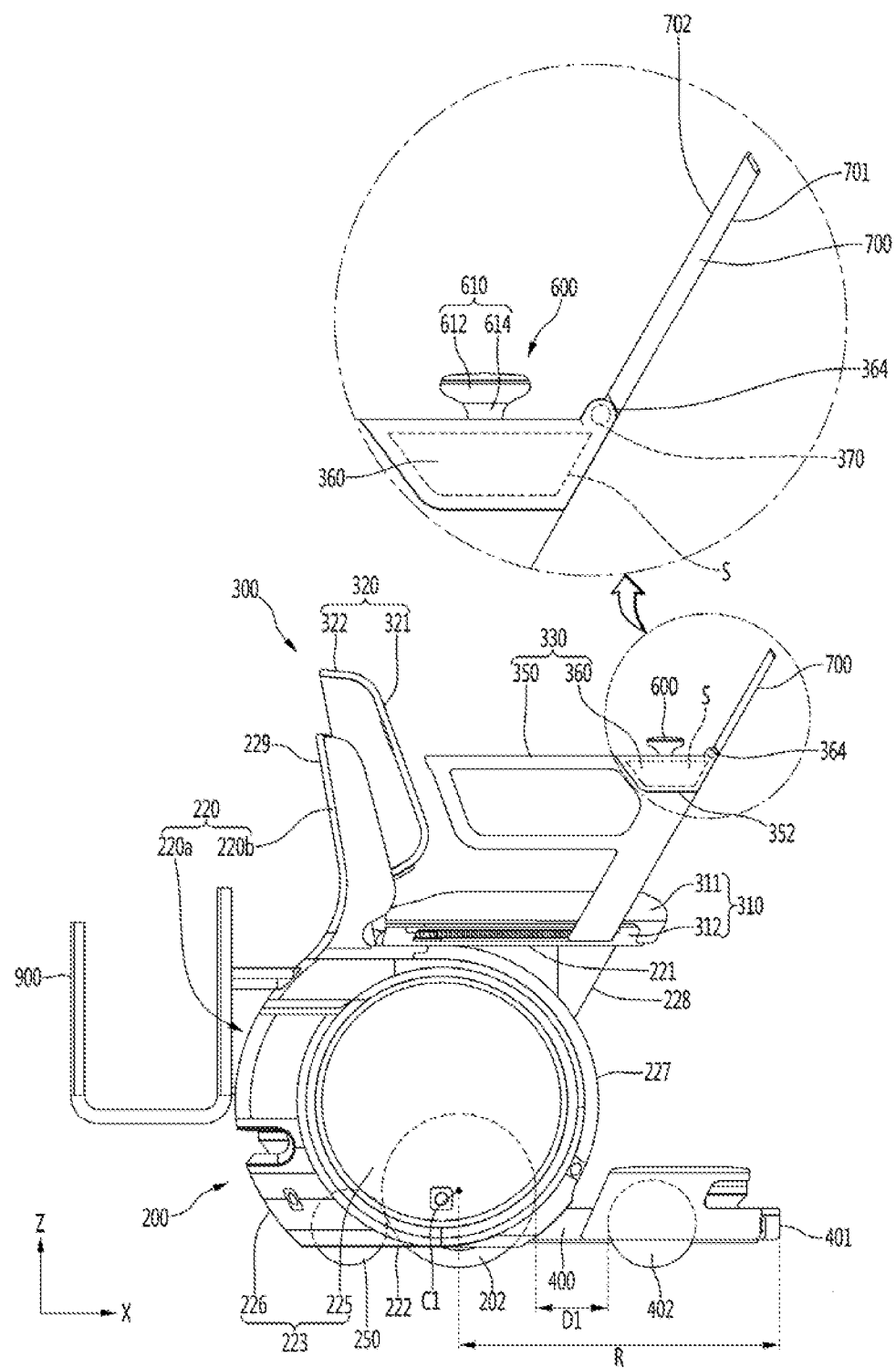
FIG. 7 is a side view of the robot according to an embodiment.

FIG. 4 is a perspective view of a robot according to an embodiment, FIG. 5 is a plan view of the robot according to an embodiment, FIG. 6 is a front view of the robot according to an embodiment, and FIG. 7 is a side view of the robot according to an embodiment.

The robot 100a may include a main body 200.

The main body 200 may include at least one traveling wheel and may be a traveling module or a mobile robot that is capable of traveling or according to a user's input autonomously traveling.

The main body 200 may be an assembly of a plurality of parts, and the main body 200 may further include a driving mechanism (or traveling mechanism) that is connected to the traveling wheel 202 and 204 to allow the traveling wheel 202 and 204 to rotate forward and backward.

The traveling wheel may be provided in a pair on the main body 200. The pair of traveling wheels 202 and 204 may be provided on the main body 200 so as to be spaced apart from each other in a left-right direction Y.

The driving mechanism may include a traveling motor generating driving force for allowing the traveling wheels 202 and 204 to rotate. In an example of the driving mechanism, the traveling motor may be directly connected to the traveling wheels 202 and 204 so that the traveling wheels 202 and 204 directly rotate forward and backward by the traveling motor. In another example of the driving mechanism, the traveling motor may be connected to the traveling wheels 202 and 204 through various power transmission members such as a rotation shaft and gears to allow the traveling wheels 202 and 204 to rotate forward and backward through the power transmission member.

The main body 200 may include a separate steering wheel disposed to be spaced apart from the traveling wheels 202 and 204 so as to switch a traveling direction of the robot 100a. The direction of the steering wheel and the traveling direction of the main body 200 may be determined by a steering 600 that will be described below.

The main body 200 may not include the separate steering wheel for switching the traveling direction of the main body 200, and the traveling direction of the main body 200 may be determined using a pair of traveling wheels 202 and 204. The traveling direction of the main body 200 may be determined using the rotation direction of each of the pair of traveling wheels 202 and 204 or a difference in rotation speed of the pair of traveling wheels 202 and 204.

The main body 200 may be configured to allow the pair of traveling wheels 202 and 204 to rotate independently with respect to each other and include a pair of traveling motors 206 and 208 for allowing the pair of traveling wheels 202 and 204 to rotate. The pair of traveling motors 206 and 208 may include a right traveling motor 206 for allowing the right traveling wheel 202 of the pair of traveling wheels 202 and 204 to rotate and a left traveling motor 208 for allowing the left traveling wheel 204 of the pair of traveling wheels 202 and 204 to rotate.

The main body 200 may further include a battery 210 for supplying power to each component of the robot 100a. The battery 210 may be disposed in the main body 200 in consideration of a center of gravity of the entire robot 100a.

The main body 200 may include a housing 220 defining an outer appearance. The housing 220 may be provided as an assembly of a plurality of members. The housing 220 may include a top surface 221, a bottom surface 222, and a circumferential surface 223.

Each of the top surface 221 and the bottom surface 222 of the housing 220 may have a planar shape, and the circumferential surface 223 of the housing 220 may have a curved shape.

The circumferential surface 223 may include a left surface 224, a right surface 225, a rear surface 226, and a front surface 227.

The left surface 224 may be convex toward a left side, and the right surface 225 may be convex toward a right side. And, the rear surface 226 may be convex toward a rear side between an upper end and a lower end. The front surface 227 may be convex forward between the upper and lower ends.

The upper end of the front surface 227 of the circumferential surface 223 may extend closer to a rear end among a front end of the top surface 221 and the rear end of the top surface 221.

The circumferential surface 223 may further include a plane 228 extending from one side of the convex front surface 227 to the front end of the top surface 221. The plane 228 may be an inclined surface that is inclined to face in a front lower direction.

The housing 220 may further include an upper rear surface 229 extending upward from an upper portion of the convex rear surface 226.

The housing 220 includes a lower housing 220a including a top surface 221, a bottom surface 222, and a circumferential surface 223 and an upper housing 220b extending from one side of the lower housing 220a to protrude upward and including an upper rear surface 229.

The lower housing 220a may be provided in a spherical shape of which each of top and bottom surfaces 221 and 222 are flat as a whole.

The upper housing 220b may extend from a rear upper portion of the lower housing 220a to a rear side of a backrest 320 to be described later.

The traveling wheels 202 and 204 may be rotatably disposed in the housing 220, and a lower portion of each of the traveling wheels 202 and 204 may be disposed in the housing 220 to pass through a wheel through-hole defined in a lower portion of the housing 220.

A space may be defined in the housing 220, and the battery 210 may be accommodated in the space defined in the housing 220.

The robot 100a may further include a seating body 300 disposed above the main body 200 and a foot supporter 400 disposed in front of the main body 200.

The seating body 300 may be configured to allow the user to be seated. The seating body 300 may be provided with a seat for allowing the user to be seated thereon. Also, the seating body 300 may be provided with an armrest 330, 340 for allowing a user's arm to be placed. A height of the armrest may be higher than a height of the seat.

The seating body 300 may further include a seat body 310 on which the user sits and a backrest 320 on which the user leans back.

The seat body 310 may include a lower cushion 311 and a lower seat body 312 on which the lower cushion 311 is mounted.

The lower cushion 311 may be disposed on a top surface of the lower seat body 312. The lower cushion 311 may be provided to be more elastic than the lower seat body 312.

The lower seat body 312 may be disposed on an upper portion of the housing 220, in particular, the lower housing 220a. The lower seat body 312 may cover a space defined in the housing 220.

The seat body 310 may not include the lower cushion 311, but may include the lower seat body 312.

The backrest 320 may include a rear cushion 321 and a rear seat body 322 supporting the rear cushion 321. The rear seat body 322 may be supported by a rear supporter 324, and the backrest 320 may further include the rear supporter 324.

The rear cushion 321 may be disposed on a front surface of the rear seat body 322. The rear cushion 321 may be provided to be more elastic than the rear seat body 322.

The rear seat body 322 may entirely or partially overlap the upper housing 220b in a front-rear direction, and the rear supporter 324 may overlap the upper housing 220b in the front-rear direction. The rear seat body 322 and the rear supporter 324 may be protected by the upper housing 220b.

A lower portion of the rear supporter 324 may be connected to the lower seat body 312. The rear supporter 324 may be configured so that an upper part thereof is bent with respect to the lower part thereof. The lower portion of the rear supporter 324 may be rotatably connected to the lower seat body 312 by a hinge shaft, and the backrest 320 may be disposed to rotate about the lower portion.

The backrest 320 may not include the rear cushion 321, but may include the rear seat body 322 and the rear supporter 324.

The armrest may be disposed in the seat body 310 so as to move forward and backward. The armrest 330, 340 may be provided in a pair on the seating body 300.

The pair of armrests 330 and 340 may include a right armrest 330 and a left armrest 340 and the right armrest 330 and the left armrest 340 may be spaced apart from each other in the left-right direction Y and may be arranged symmetrical to each other in the left-right direction Y.

The pair of armrests 330 and 340 may be disposed on the seat body 310, in particular, the lower seat body 312 so as to move forward and backward, and a lower portion of each of the pair of armrests 330 and 340 may be inserted into the lower seat body 312. The lower portion of each of the pair of armrests 330 and 340 may be guided to move forward and backward in a front-rear direction X along a guide provided on the seat body 310.

The foot supporter 400 may be disposed on the main body 200. The foot supporter 400 may be disposed on the main body 200 to protrude in the front-rear direction. The foot supporter 400 may be disposed at a front lower portion of the main body 200. The foot supporter 400 may be disposed on the main body 200 to move forward and backward in the front-rear direction X.

An auxiliary wheel supporting the foot supporter 400 may be disposed on the foot supporter 400. A pair of auxiliary wheels may be provided on the foot supporter 400, and the pair of auxiliary wheels 402 and 404 may be disposed the foot supporter 400 so as to be spaced apart from each other in a horizontal direction.

The robot 100a may include a steering 600 operated by the user. The steering 600 may be an adjusting device such as a jog & shuttle or a joystick.

The steering 600 may include a handle 612 held by the user. The steering 600 may be an input interface that is held and manipulated by the user's hand to input a traveling direction or traveling speed of the robot 100a.

The steering 600 may be disposed on at least one armrest. The steering 600 may be provided on each of the pair of armrests 330 and 340 and may be disposed on one of the pair of armrests 330 and 340.

The steering 600 may include a steering body 610 that is held by the user's hand. The steering body 610 may be a body which is held by the user's hand so as to be manipulated in various directions such as front, rear, left, and right directions. A handle 612 that is held by the user's hand may be disposed on an upper portion of the steering body 610. The steering body 610 may include a steering shaft 614 extending from a lower portion of the handle 612.

The user may hold the handle 612 while sitting on the seat body 310 to push the steering body 610 forward, pull the steering body 610 backward, or push the steering body to a left or right side.

For example, in the steering body 610, the handle 612 is inclined to one side such as the front, rear, left, or right side with respect to the steering shaft 614. The robot 100a may include a sensor sensing an inclination angle and an inclination direction of the steering body 610. The robot 100a may sense a steering direction or speed by the inclination angle (or inclination angle), the inclination direction, etc. of the steering body 610, which are sensed by the sensor.

For another example, in the steering body 610, the steering shaft 614 and the handle 612 may be disposed to move to the front, rear, left, or right side. The robot 100a may include a sensor sensing a position of the steering body 610. The robot 100a may sense the steering direction or speed according to the position of the steering body 610, which is sensed by the sensor.

In another example, in the steering body 610, the steering shaft 614 and the handle 612 may be disposed to rotate in a clockwise or counterclockwise direction. The robot 100a may include a sensor sensing a rotation angle of the steering body 610. The robot 100a may sense the steering direction or speed according to the rotation angle of the steering body 610, which is sensed by the sensor.

The sensor may transmit a signal of the sensed steering direction or speed to a processor 180, and the processor 180 may control the traveling motors 206 and 208 which will be described later according to the signal transmitted from the sensor.

The robot 100a may further include a display 700. The display 700 may be disposed on at least one of the pair of armrests 330 and 340. The display 700 may be disposed to rotate about a horizontal rotation center. The display 700 may be an output interface capable of displaying various information such as traveling information.

The display 700 may be rotatably connected to the steering housing 360. The display 700 may be connected to the front end of the steering housing 360.

The display connection portion 364 to which the display 700 is rotatably connected may be provided in the steering housing 360.

The display connection portion 364 may be spaced apart from the steering body 610 in a horizontal direction when the steering body 610 ascends.

The robot 100a may further include a display rotator 370 that allows the display 700 to rotate. The display rotator 370 may be a rotating mechanism for allowing the display 700 connected to the display 700 to rotate. The display rotator 370 may include a display motor connected to the display 700 to allow the display 700 to rotate. Hereinafter, for convenience, like the display rotator 370, the display motor will be described with reference numeral 370. The display motor 370 may be disposed to be accommodated in the display connection portion 364. A motor space in which the display motor 370 is accommodated may be defined in the display connection portion 364.

The display motor 370 may be provided with a rotation shaft that allows the display 700 to rotate, and the rotation shaft may be disposed horizontally. The rotation shaft may be lengthily disposed in the left-right direction Y. The display motor 370 may allow the display 700 to rotate so that the display 700 is erected about a rotation axis, or the display 700 is laid down.

In this specification, the display 700 is not limited to being vertically erected, but may be defined to include being erected at a predetermined angle.

The display 700 may include a front surface 701 facing a front side and a rear surface 702 facing a rear side with respect to the standing display 700. A screen that is capable of providing a variety of information to the user may be disposed on the rear surface 702 of the display 700. A touch screen may be disposed on the rear surface 702 of the display 700, and the user may input various commands through the touch screen.

The display 700 may rotate side by side with the top surface of the armrest on the armrest. In this case, the front surface 701 when the display 700 is erected may be a top surface of the display 700, and the rear surface 702 when the display 700 is erected may be a bottom surface of the display 700.

When the display 700 is laid horizontally, the screen of the display 700 is hidden from the outside, and the screen of the display 700 may be protected.

The robot 100a may further include at least one accessory that provides convenience to the user.

The accessory may be provided on the armrest or the main body 200, and a plurality of accessories may be provided on the robot 100a.

The robot 100a may include an accessory 800 (armrest accessory) provided on the armrest. The robot 100a may include an accessory 900 provided on the main body 200 (body accessory). The robot 100a may include both the accessory 800 provided on the armrest and the accessory 900 provided on the main body 200.

For example, the accessory 800 provided on the armrest may be a cup holder into which a cup is seated. For another example, the accessory 800 provided on the armrest may be a sub armrest having the same size and shape as the steering housing 360 but without an opening 362 defined in an upper portion thereof.

The steering housing 360 according to this embodiment may be selectively disposed on the armrest body 350 of the left armrest 340 or the armrest body 350 of the right armrest 330 for the convenience of the user. That is, the accessory such as the cup holder or a sub armrest may be disposed on the armrest body 350 of the armrest, in which the steering housing 360 is not disposed, among the left armrest 340 and the right armrest 330 and may support the user's arm together with the armrest body 350.

The accessory 800 provided on the armrest is not limited to the cup holder or the sub armrest, and also is not limited to the kind thereof as long as it provides the user's convenience and is accommodated in the accommodation portion 352.

An opening 362 may be defined in the armrest, and an inner space S in which a portion of the steering 600 is accommodated may be defined in the armrest. When the robot 100a includes a pair of armrests 330 and 340, the steering 600 may be disposed on one of the pair of armrests 330 and 340.

At least one of the pair of armrests 330 and 340 may be an assembly of a plurality of members, and at least one of the pair of armrests 330 and 340 may include the armrest body 350 and the steering housing 360.

One of the pair of armrests 330 and 340 330 may include the armrest body 350 and the steering housing 360 disposed on the armrest body 350. An accommodation portion 352 in which the steering housing 360 is accommodated may be defined in the armrest body 350.

The accommodation portion 352 may be provided in a shape that is recessed in the armrest body 350. A top surface of the accommodation portion 352 may be opened. Each of the top and front surfaces of the accommodation portion 352 may be opened.

The steering housing 360 may be inserted into and accommodated in the accommodation portion 352 and may be protected by the accommodation portion 352.

The steering housing 360 may surround at least a portion of the steering 600 and may protect the steering 600.

The other one of the pair of armrests 330 and 340 may include the armrest body 350 and may further include an accessory 800 disposed on the armrest body 350. The armrest body 350 may be provided with the accommodating portion 352 in which the accessory 800 is accommodated.

The pair of armrests 330 and 340 may include the armrest body 350 having the same structure, and the steering housing 360 and the accessory 800 may be disposed symmetrical to each other in the horizontal direction. Each of the pair of armrests 330 and 340 may be provided with the accommodation portions 352 having the same shape and the same size.

The accessory 800 and the steering housing 360 may have the same size and outline shape.

The steering housing 360 and the accessory 800 may have the same shape and size and may be disposed symmetrical to each other with respect to the seating body 300.

The steering housing 360 may constitute a steering assembly together with steering 600. The steering assembly may be selectively disposed together with the accessory 800.

When the steering housing 360 is disposed on the armrest body 350 of the right armrest 330, the accessory 800 may be disposed on the armrest body 350 of the left armrest 340, and vice versa. When the steering housing 360 is disposed on the armrest body 350 of the left armrest 340, the accessory 800 may be disposed on the armrest body 350 of the right armrest 330.

For example, the accessory 900 provided on the main body 200 may be a supporter on which a user's baggage (e.g., a carrier) is placed. For another example, the accessory 900 provided on the main body 200 may be a supporter on which a medical device (e.g., crutches, medicines, etc.) assisting user's walk is supported. The accessory 900 provided on the main body 200 is not limited to the supporter, and also, the accessory 900 is not limited in kind as long as the accessory 900 moves with the user. Various kinds of accessories 900 may be separably attached to the main body 200.

The robot may include a plurality of auxiliary wheels disposed on at least one of the main body 200 or the foot supporter 400.

An auxiliary wheel 250 that assists the traveling wheels 202 and 204 may be disposed on the main body 200. The auxiliary wheel 250 may be a wheel for improving stability of a rear portion of the robot and may be rotatably disposed on the main body 200.

The auxiliary wheel 250 disposed on the main body 200 may be a rear wheel closer to a rear end of the front end 401 of the robot and the rear end of the robot. Hereinafter, the rear wheel will be described with reference numeral 250.

The foot supporter 400 may be disposed at a front lower portion of the main body 200, and the auxiliary wheels 402 and 404 disposed on the foot supporter 400 may be rotatably disposed on the foot supporter 400 to improve stability of the front portion of the robot.

When the pair of auxiliary wheels 402 and 404 are disposed on the foot supporter 400, the pair of auxiliary wheels 402 and 404 may be disposed to be spaced apart from each other as far as possible in the left-right direction Y. In this case, the foot supporter 400 may be stably supported on the widest area.

The auxiliary wheels 402 and 404 disposed on the foot supporter 400 may be front wheels closer to the front end 401 of the robot and the rear end of the robot. Hereinafter, the auxiliary wheels 402 and 404 disposed on the foot supporter 400 will be described as front wheels 402 and 404.

In the robot, a rotation radius R of the robot according to a distance D1 between the pair of traveling wheels 202 and 204 and the front wheels 402 and 404, types and positions of the front wheels 402 and 404, and types and positions of the rear wheels 250 may vary.

In the robot, a portion between the pair of traveling wheels 202 and 204 may be a rotation center C, and an axis extending in the vertical direction Z from the rotation center C1 may be a rotation center axis C2 of the robot. In this case, the seating body 300 may be disposed above the rotation center C1 of the robot, and the seating body 300 may be disposed at the rotation center axis C2.

The robot may be driven forward or backward by driving the left driving motor 208 and the right driving motor 206 at the same speed, and the robot may travel along a forward moving path or a backward moving path.

The robot may drive the left driving motor 208 and the right driving motor 206 at different speeds to turn right or left.

The robot may drive one of the left travel motor 208 and the right travel motor 206 in reverse with respect to the forward traveling, and the robot may rotate in a clockwise CW direction or counterclockwise CW direction about the rotation center axis C2 including the rotation center C1 between the pair of traveling wheels 202 and 204. That is, the robot may rotate at an angle of about 360° about the rotation center axis C2 and rotate about the rotation center axis C2.

When the robot rotates about the rotation center axis C2, an area of the robot may be determined by the rotation radius R of the robot.

The rotation radius R of the robot may be defined as a distance between the rotation center C1 and a front end 401 of the foot supporter 400.

A distance D1 between the pair of traveling wheels 202 and 204 and the front wheels 402 and 404 may be greater than the distance between the pair of traveling wheels 202 and 204 and the rear wheel 250. The robot may be preferably configured to easily rotate to the left or right side in a narrow space.

The robot may preferably rotate in the clockwise CW direction or counterclockwise CW direction about the rotation center axis C2 in the narrow space. For this purpose, the robot may preferably have a small rotation radius R, and the pair of traveling wheels 202 and 204 may be preferably disposed in close proximity as large as possible with the front wheels 402 and 404 so as to minimize the rotation radius R of the robot.

When the main body 200 is turned to the left or right side due to the driving of the traveling wheels 202 and 202, the rear wheel 250 and the front wheels 402 and 404 may be preferably disposed to assist the smooth turning movement of the main body 200. In addition, the rear wheel 250 and the front wheels 402 and 404 may be preferably configured so that the robot smoothly rotates in the clockwise or counter-clockwise direction about the rotation center axis C2. At least one of the rear wheel 250 or the front wheels 402 and 404 may be an omni wheel.

Figure 8:
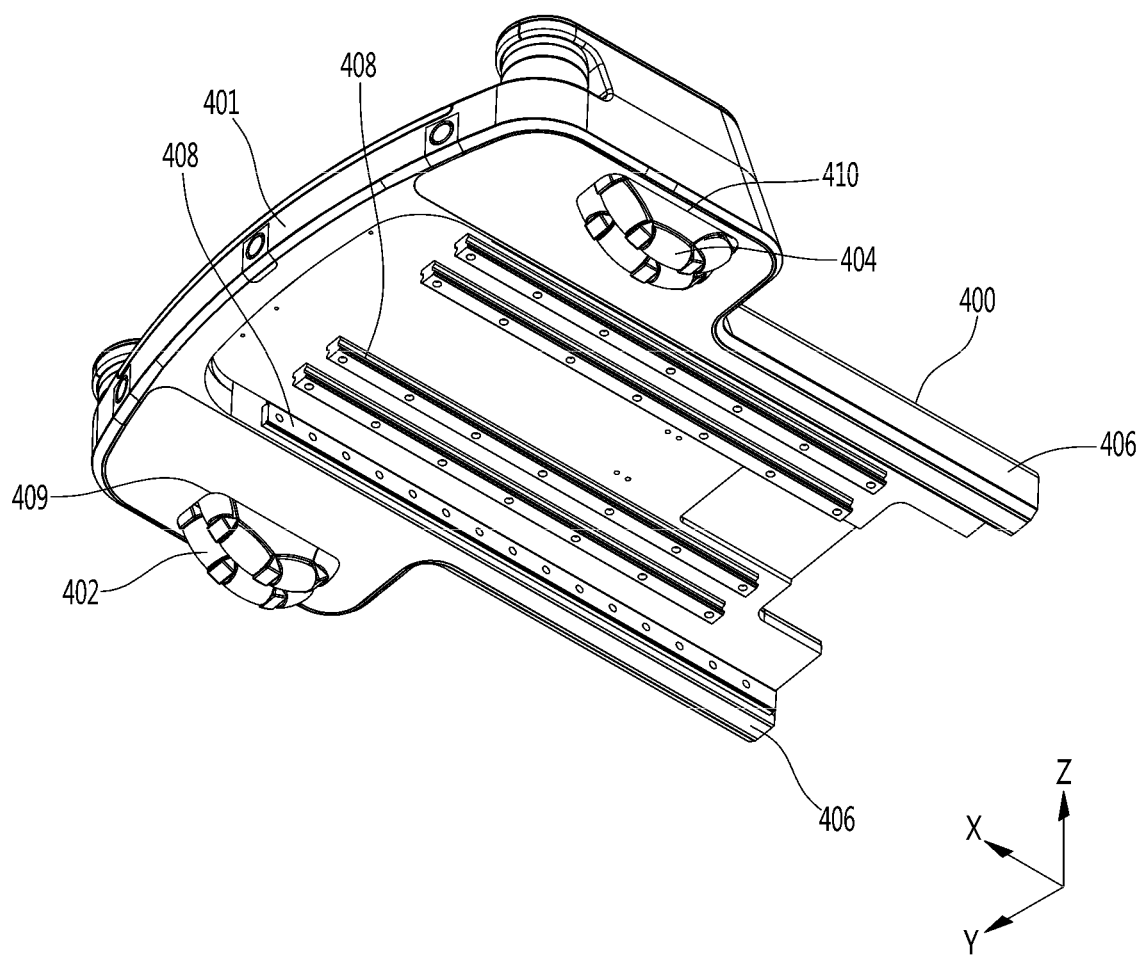
FIG. 8 is a view of a foot supporter and a front wheel according to an embodiment.
Figure 9:
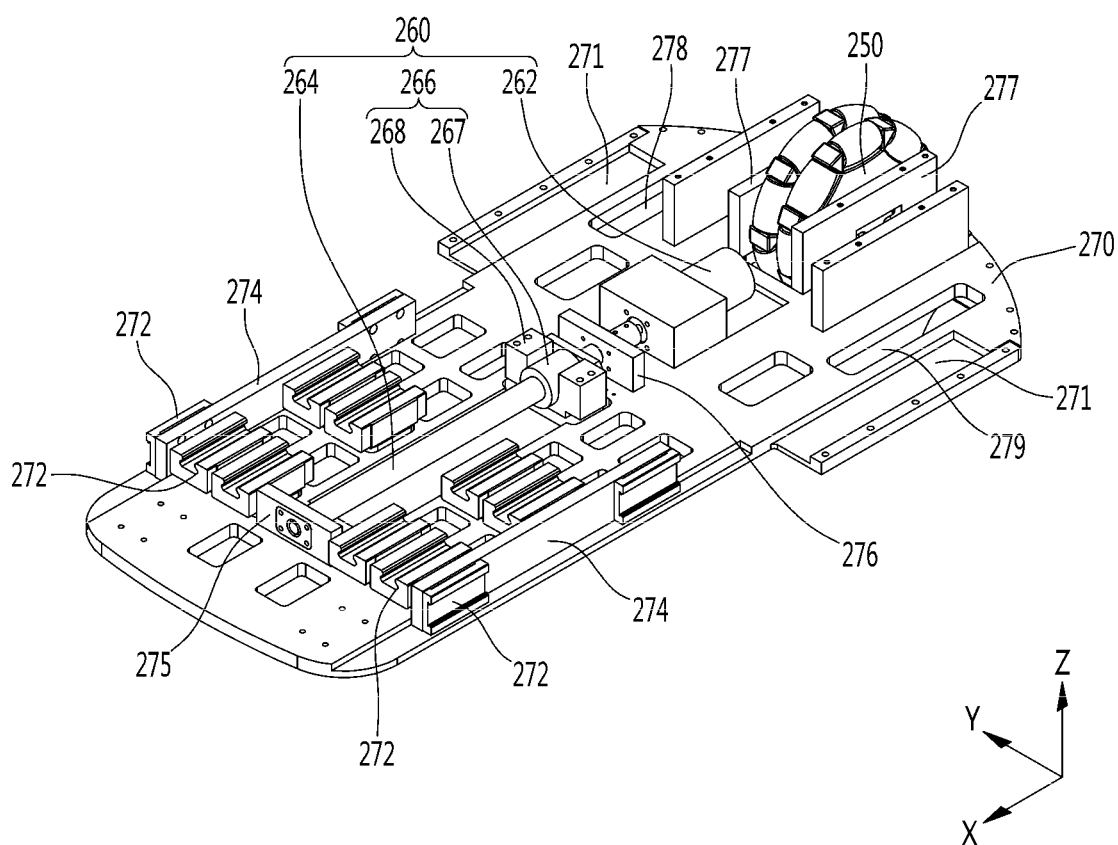
FIG. 9 is a view of a foot supporter mover and a rear wheel according to an embodiment.

FIG. 8 is a view of the foot supporter and the front wheel according to an embodiment, and FIG. 9 is a view of a foot supporter mover and the rear wheel according to an embodiment.

The robot may further include a foot supporter mover 260 for allowing the foot supporter 400 to move forward or backward.

The foot supporter mover 260 may be connected to the foot supporter 400 and may allow the foot supporter 400 to move in the front-rear direction X.

The foot supporter mover 260 may include a motor 262 and at least one power transmission member for transmitting driving force of the motor 262 to the foot supporter 400. The power transmission member constituting the foot supporter mover 260 may include a screw 264 rotating by the motor 262 and a carrier 266 disposed to move along the screw 264 and connected to the foot supporter 400.

The motor 262 may be mounted to be disposed behind the screw 264 and may allow the screw 264 to rotate.

The screw 264 may be lengthily disposed in the front-rear direction X and may be connected to the motor 262 to rotate by the motor 262. The connection between the screw 264 and the motor 262 may be defined as including not only that the screw 264 is directly connected to the rotation shaft of the motor 262, but also the screw 264 is connected to the motor 264 by the power transmission member, such as a gear.

The carrier 266 may linearly move along the screw 264 and include a screw body 267 in which a screw thread 267 moving along the screw 264 is disposed on an inner circumference thereof and which surrounds a portion of an outer circumference of the screw 264 and a connector 268 connected to the screw body 267 and coupled to the foot supporter 400 by a coupling member such as a screw or pin.

The carrier 266 may move in the front-rear direction X along the screw 264 at the lower portion of the foot supporter 400 to allow the foot supporter 400 to move in the front-rear direction X.

The foot supporter mover 260 is not limited to including the screw 264 and the carrier 266 as described above and may include a driving gear such as a pinion gear connected to the motor 262 and a driven gear such as a rack gear provided on the foot supporter 400. Here, the foot supporter mover 260 is not limited in type as long as the foot supporter mover 260 allows the foot supporter 400 to move in the front-rear direction X.

A lower plate 270 that is capable of guiding the forward and backward movement of the foot supporter 400 may be disposed on the main body 200. The lower plate 270 may be a foot supporter guide for guiding the foot supporter 400, and the foot supporter 400 may be disposed on the main body 200 by the lower plate 270 to move forward and backward.

The lower plate 270 may be a fixed supporter disposed on the body 200, in particular, the housing 220 so as to guide the foot supporter 400. The lower plate 270 may be a movable supporter that guides the foot supporter 400 to allow the foot supporter 400 to move forward and backward.

The foot supporter 400 may include a protrusion 406 disposed in a backward direction, and a protrusion guide 271 that is movably seated on the lower plate 270 to guide movement of the protrusion 406 may be disposed on the lower plate 270. The protrusion guide 271 may be provided in a shape that is recessed from a top surface of the lower plate 270. The protrusion guide 271 may have a shape in which left, right, rear, and bottom surfaces are blocked, and the protrusion 406 may be guided by the protrusion guide 271 in a state of being accommodated and in contact with the protrusion guide 271.

The robot may further include a guide body 408 disposed on the foot supporter 400. The guide body 408 may be lengthily disposed in the front-rear direction X on the foot supporter 400.

The lower plate 270 may be provided with a guide rail 272 for guiding the guide body 408. The lower plate 270 may have a guide rail mounter 274 on which the guide rail 272 is mounted. The guide rail mounter 274 may be elongated in the front-rear direction X on the lower plate 270, and the guide rail 272 may be mounted on the guide rail mounter 274 and disposed in the front-rear direction X to guide the guide body 408 in the front-rear direction X.

The foot supporter mover 260 may be disposed on the lower plate 270. The motor 262 may be mounted to the lower plate 270 so as to be disposed behind the screw 264.

The lower plate 270 may have at least one screw supporter 275 and 276 rotatably supporting the screw 264.

The rear wheel 250 may be rotatably disposed on the lower plate 270, and a rear wheel supporter 277 may be disposed on the lower plate 270 to rotatably support the rear wheel 250.

The rear wheel supporter 277 may be provided in pairs on the lower plate 270, and the pair of rear wheel supporters 277 may be disposed to rotatably support the rear wheel 250, in particular, the main wheel (or main frame wheel) next to the rear wheel 250. A support shaft that is lengthily disposed in the horizontal direction may be disposed on one of the rear wheel 250 and the rear wheel supporter 277, and a support shaft supporter rotatably supporting the support shaft may be disposed on the other of the rear wheel 250 and the rear wheel supporter 277.

Traveling wheel through-holes 278 and 279 through which the traveling wheels 202 and 204 rotatably pass may be defined in the lower plate 270.

The traveling wheel through-holes 278 and 279 may be defined to pass through the lower plate 270 in the vertical direction Z. The traveling wheel through-holes 278 and 279 may be provided in the lower plate 270 in a pair, and the pair of traveling wheel through-holes 278 and 279 may be spaced apart from each other in the left-right direction Y.

Each of the pair of traveling wheels 202 and 204 and the rear wheel 250 may be disposed to rotate independently with respect to each other on the main body 200 including the lower plate 270.

The front wheels 402 and 404 may be provided in a pair. The pair of front wheels 402 and 404 may be spaced apart from each other in the left-right direction Y on the foot supporter 400.

A front wheel supporter for rotatably supporting the front wheels 402 and 404 may be disposed inside the foot supporter 400. The front wheel supporter may be provided for each pair of front wheels 402 and 404.

Front through-holes 409 and 410 through which the front wheels 402 and 404 pass may be defined in the foot supporter 400. The front through-holes 409 and 410 may be defined to be opened in the vertical direction Z on the lower plate of the foot supporter 400. The front through-holes 409 and 410 may be provided in a pair in the foot supporter 400, and the pair of front through-holes 409 and 410 may be defined in the foot supporter 400 so as to be spaced apart from each other in the left-right direction.

The pair of front wheels 402 and 404 may be disposed to rotate independently with respect to each other on the foot supporter 400.

The robot may include a processor 180 that controls an overall operation of the robot, and the processor 180 may control the foot supporter mover 260 and the pair of driving motors 206 and 208. The processor 180 may drive the motor 262 forward and backward when the foot supporter mover 260 is controlled.

When the motor 262 rotates the rotation shaft in one direction, the carrier 266 and the foot supporter 400 may be advanced in the forward direction, and when the motor 262 allows the rotation shaft to move in the other direction, the carrier 266 and the foot supporter 400 may be retracted in the forward direction.

Figure 10:
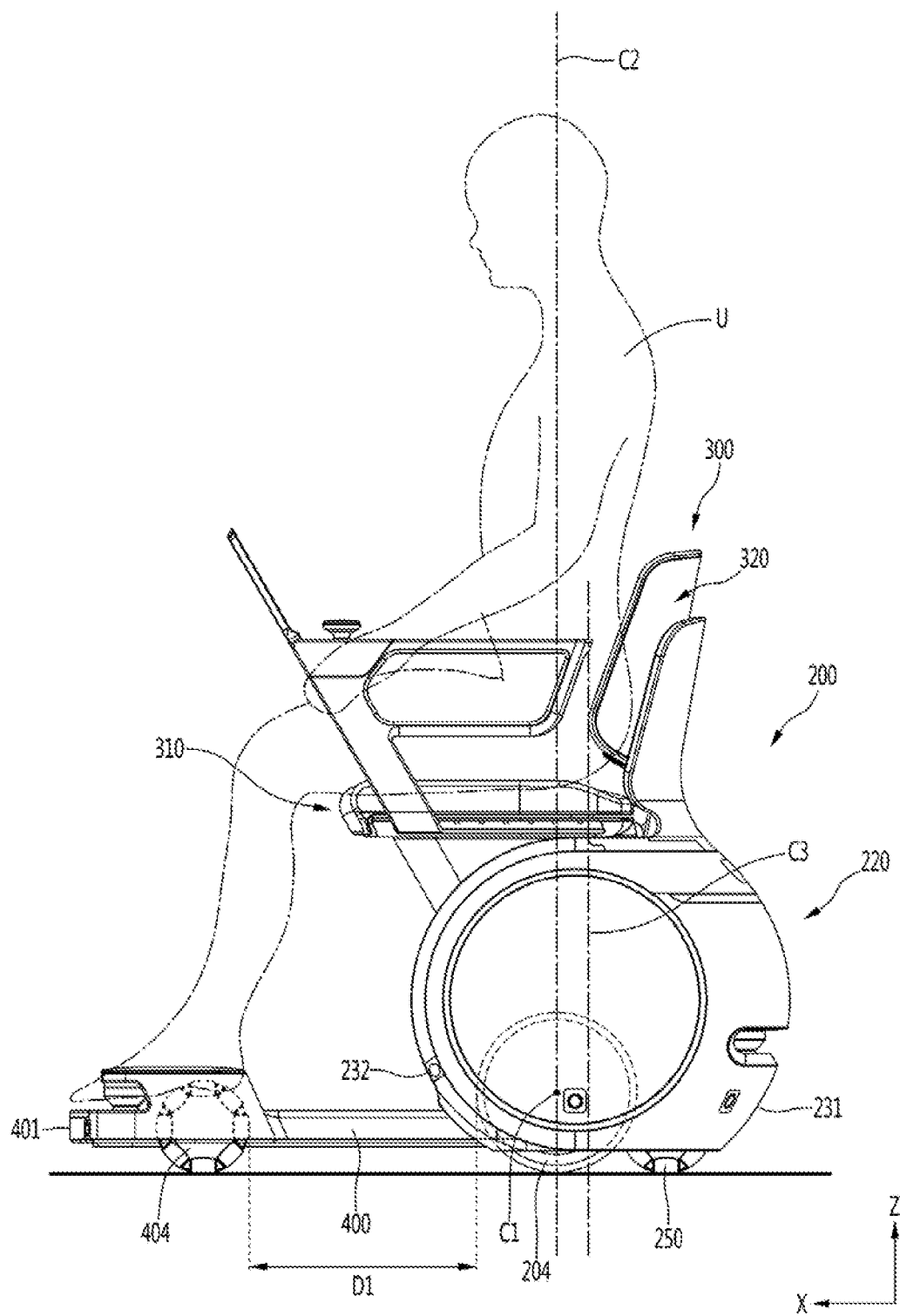
FIG. 10 is a side view when a passenger boards on the robot according to an embodiment.
Figure 11:
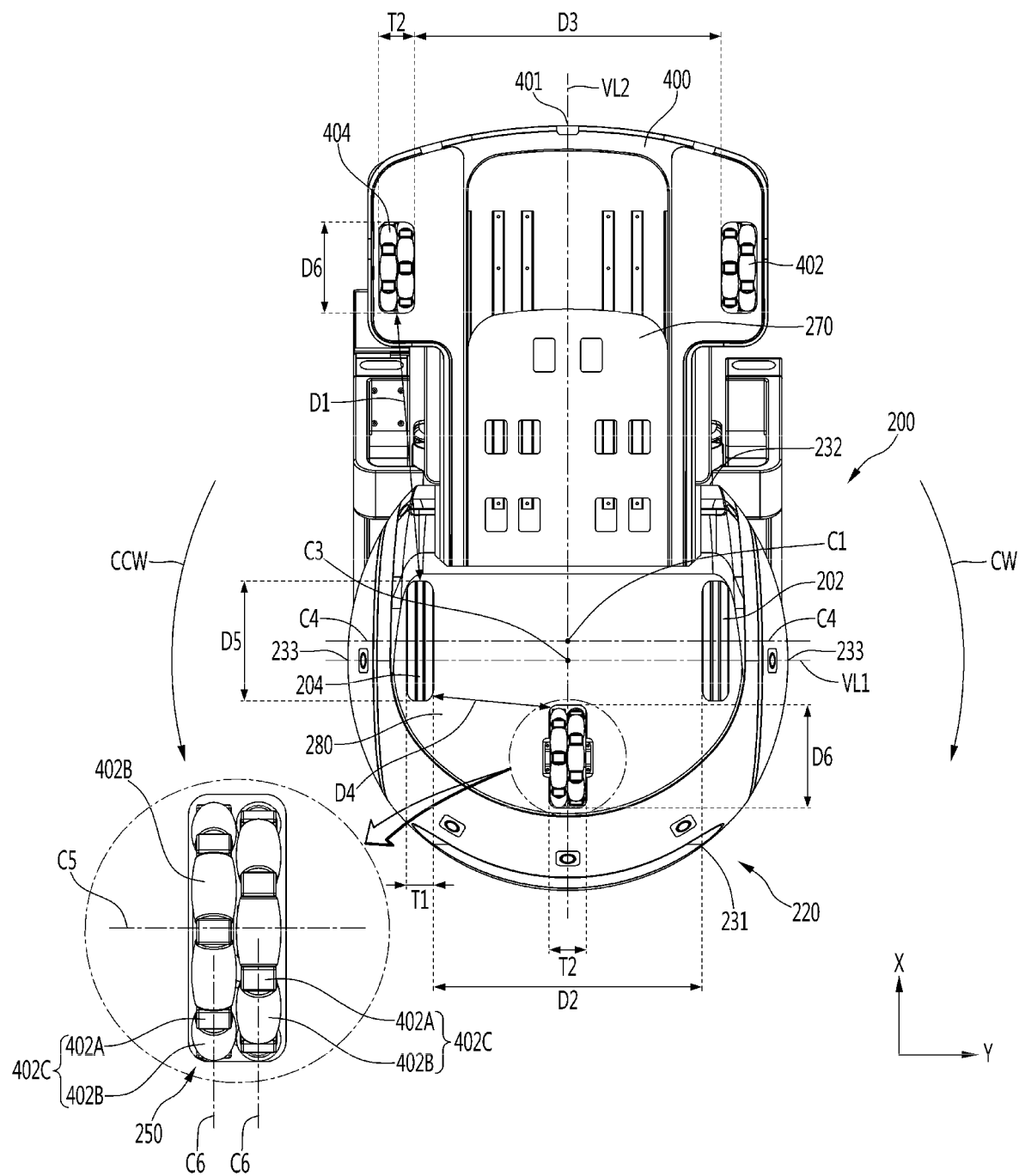
FIG. 11 is a bottom view when the foot supporter moves forward in an advance mode according to an embodiment.
Figure 12:
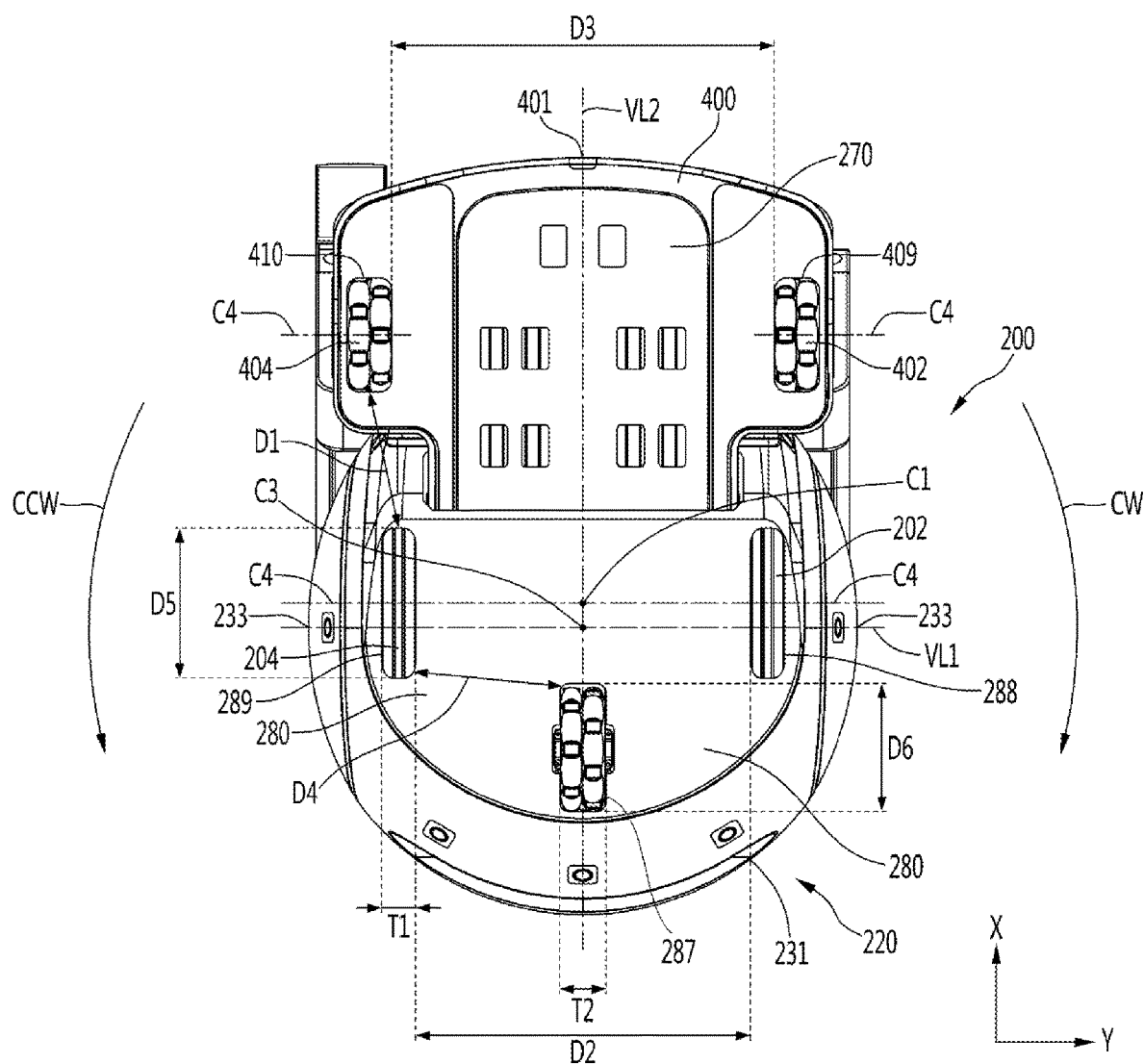
FIG. 12 is a bottom view when the foot supporter moves backward in a retreat mode according to an embodiment.

FIG. 10 is a side view when a passenger boards on the robot according to an embodiment, FIG. 11 is a bottom view when the foot supporter moves forward in an advance mode according to an embodiment, and FIG. 12 is a bottom view when the foot supporter moves backward in a retreat mode according to an embodiment.

The main body 200 may further include a lower cover 280 that covers a portion of the lower plate 270. The lower cover 280 may be disposed below a rear portion of the lower plate 270 to cover the rear portion of the lower plate 270.

As illustrated in FIG. 12, the lower cover 280 may be provided with a rear through-hole 287 through which the rear wheel 250 rotatably passes. As illustrated in FIG. 12, the lower cover 280 may be provided with side through-holes 288 and 289 through which the traveling wheels 202 and 204 rotatably pass.

Each of the rear through-holes 287 and the side through-holes 288 and 289 may be defined to be opened in the vertical direction Z.

The pair of side through-holes 288 and 289 may be provided in the lower cover 280, and the pair of side through-holes 288 and 289 may be spaced apart from each other in the lower cover 280 in the left-right direction Y.

Each of the rear wheels 250 and the front wheels 402 and 404 may be an omni wheel that assists the main body 200 to rotate smoothly about the central axis of rotation C2 of the robot, and also, as illustrated in FIG. 11, may include a main wheel 202A and a plurality of barrels 402B disposed on the main wheel 202A.

The main wheel 202A may be disposed on the main body 200 or the foot supporter 400. The main wheel 202A may be disposed to have a rotation center axis C5 parallel to the rotation center axis C4 of the traveling wheels 202 and 204. The main wheel 202A may be disposed on the main body 200 or the foot supporter 400 to rotate about the horizontal rotation center axis C5.

A barrel accommodation groove into which the barrel 402B is rotatably accommodated may be defined in an outer circumference of the main wheel 202A in a shape that is recessed toward the rotation center axis C5 of the main wheel 202A.

Each of the plurality of barrels 402B may be disposed to rotate about a rotation center axis C6 in a direction different from the rotation center axis C5 of the main wheel 402A.

The rotation center axis of rotation C6 of each of the plurality of barrels 402B may be perpendicular to the rotation center axis C5 of the main wheel 402A, and the plurality of barrels 402B may be disposed to be spaced apart from each other in a circumferential direction along an outer circumference of the main wheel 202A.

Each of the rear wheels 250 and the front wheels 402 and 404 may include a pair of omni wheel assemblies 402C and 402D including the main wheel 402A and the plurality of barrels 402B. Each of the pair of omni wheel assemblies 402C and 402D may be rotatably supported independently on the main body 200 or the foot supporter 400. The pair of omni wheel assemblies 402C and 402D may be connected together to rotate together.

When the main body 200 moves, the main wheel 402A of the omni wheel may rotate about the rotation center axis C5 of the main wheel 402A, and the rotating main wheel 402A may assist stable movement of the main wheel 402A and the foot supporter 400.

During a clockwise CW rotation or a counterclockwise CCW rotation of the main body 200, each of the plurality of barrels 402B may rotate about the rotation center axis C6, and the rear wheel 205 and the front wheels 402 and 404 may assist to rotate about the rotation center axis C2 of the robot.

The traveling wheels 202 and 204 may be disposed closer to the front end 232 of the main body 200 than to the rear end 231 of the main body 200. The rear end 231 of the main body 200 may be defined as the rear end of the housing 220, and the front end 232 of the main body 200 may be defined as the front end of the housing 220.

A distance (the shortest distance in the front-rear direction) between the front end 232 of the main body 200 and the front end of the traveling wheels 202 and 204 may be less than a distance (the shortest distance in the front-rear direction) between the rear end 231 of the main body 200 and the rear end of the traveling wheels 202 and 204.

The traveling wheels 202 and 204 may be front eccentric wheels which are eccentrically disposed forward to the housing 220 in the front-rear direction X of the main body 200.

A distance D1 between the traveling wheels 202 and 204 and the front wheels 402 and 402 may be determined by the positions of the traveling wheels 202 and 204.

If the traveling wheels 202 and 204 are eccentrically closer to the rear end of the main body 200 than to the front end of the main body 200, a distance between the traveling wheels 202 and 204 and the front wheels 402 and 402 may be long, and the rotation radius R of the robot may be large.

On the other hand, if the traveling wheels 202 and 204 are the front eccentric wheels that are eccentric in the forward direction, the distance D1 between the traveling wheels 202 and 204 and the front wheels 402 and 402 may be short, and the rotation radius R of the robot may be short.

To minimize the rotation radius R of the robot, the traveling wheels 202 and 204 may be preferably front eccentric wheels disposed further eccentrically in the forward direction to the main body 200.

As described above, when the traveling wheels 202 and 204 are the front eccentric wheels, the rear wheel 250 may be disposed closer to the rear end 231 of the main body 200 than to the front end 232 of the main body 200. In this case, the rear wheel 250 may be a rear eccentric wheel that is eccentrically disposed to the rear of the main body 200 with respect to the main body 200, in particular, the front and rear center C3 of the housing 220. When the traveling wheels 202 and 204 are the front eccentric wheels, the rear portion of the robot may become unstable. When the rear wheel 250 is the rear eccentric wheel, the rear wheel 250 may stably support the rear portion of the robot.

The pair of traveling wheels 202 and 204 may coincide with the center in the front-rear direction X of a passenger U seated on the seating body 300 or be as close as possible to the center of the front-rear direction X of the passenger U.

When the rotation center axis C2 of the robot coincides with the center of the front-rear direction X of the passenger U or is as close as possible to the center of the front-rear direction X of the passenger U, the robot may rotate more stably.

A distance between the pair of traveling wheels 202 and 204 (see D2, FIGS. 11 and 12) may be less than a distance between the pair of front wheels 402 and 404 (see D3, FIGS. 11 and 12).

The traveling wheels 202 and 204 may be disposed to rotate about the horizontal rotation center axis C4, and the rotation center axis C4 of the traveling wheels 202 and 204 may be disposed in front of a virtual line VL 1 (bisection line) that bisects the main body 200, in particular, the housing 220 in the front-rear direction X as illustrated in FIGS. 11 and 12.

When the foot supporter 400 is fully advanced, the distance D1 between the traveling wheels 202 and 204 and the front wheels 402 and 404 is greater than the distance D4 between the traveling wheels 202 and 204 and the rear wheel 250.

When the rear wheel 250 is disposed on the main body 200, as shown in FIGS. 11 and 12, the rotation center axis C5 of the rear wheel 250 may be disposed further behind the front-rear center C3 of the main body 200. The rear wheel 250 may be disposed behind the virtual line VL1 that bisects the body 200 in the front-rear direction.

The rear wheel 250 may be disposed between the virtual line VL1 (first virtual line) that divides the main body 200 in the front-rear direction and a rear end 231 of the main body 200. The rear wheel 250 may be disposed on a virtual line VL2 that bisects the main body 200 in a left-right direction.

A distance (the shortest distance) between the virtual line VL2 (second virtual line) that bisects the main body 200 in the left-right direction may be greater than a distance (the shortest distance) between the traveling wheels 202 and 204 and a side end 233 (i.e., a leftmost or rightmost side) of the main body 200.

As shown in FIGS. 11 and 12, a diameter D5 of each of the traveling wheels 202 and 204 may be greater than a diameter D6 of each of the front wheels 402 and 204. The diameter D6 of each of the front wheels 402 and 404 and the diameter of the rear wheel 250 may be the same. The diameter D5 of each of the traveling wheels 202 and 204 may be greater than the diameter D6 of the rear wheel 250.

As shown in FIGS. 11 and 12, a thickness T1 of each of the traveling wheels 202 and 204 is greater than each of a thickness T2 of each of the front wheels 402 and 404 and a thickness T2 of the rear wheel 250.

When the front wheels 402 and 404 and the rear wheels 250 are identical in size and shape, the front wheels 402 and 404 and the rear wheels 250 may be shared.

According to an embodiment, the robot seated on the seating body may move or rotate in a state in which a foot of the passenger seated on the seating body is placed on the foot supporter to allow the passenger to move safely and comfortably and allow the front wheel to assist smooth movement and rotation of the foot supporter.

In addition, the traveling wheel may be closer to the front end of the main body than the rear end of the main body, and thus, it may be possible to minimize the distance between the front wheel and the traveling wheel disposed on the foot supporter and to minimize the rotation radius of the robot. When the rotation radius of the robot is minimized, the robot may smoothly and stably rotate in the narrow space.

In addition, the rear wheel may be closer to the rear end of the body than the front end of the body to minimize robot rollover that may occur when the traveling wheel is closer to the front end of the body, and also, the footrest and the body may move or rotate more stably.

In addition, the pair of front wheels may be provided to be spaced apart from each other in the left-right direction on the foot supporter, and thus, the load of the passenger may be distributed to the pair of front wheels, and excessive drooping of a portion of the foot supporter due to the passenger's load may be minimized.

In addition, each of the front wheel and the rear wheel may include the omni wheel, and when the body rotates by the traveling wheel, each of the front wheel and the rear wheel may move along the rotation center axis of the body to assist the smooth rotation of the body or the foot supporter.

The above-disclosed subject matter is to be considered illustrative, and not restrictive, and the appended claims are intended to cover all such modifications, enhancements, and other implementations, which fall within the scope of the present disclosure.

Thus, the implementation of the present disclosure is to be considered illustrative, and not restrictive.

Therefore, the scope of the present disclosure is defined not by the detailed description of the invention but by the appended claims, and all differences within the scope will be construed as being included in the present disclosure.

What is claimed is:

1. A robot, comprising:
   a main body having a front end and a rear end, the main body including:
   a first traveling wheel;
   a second traveling wheel, the second traveling wheel being spaced apart from the first traveling wheel by a first distance in a horizontal direction; and
   a rear wheel, the rear wheel being positioned closer to the rear end of the main body than both of the first traveling wheel and the second traveling wheel;
   a seating body disposed above the main body in a vertical direction, the vertical direction being perpendicular to the horizontal direction; and
   a foot supporter disposed on a lower portion of the front end of the main body, the foot supporter including:
   a first front wheel; and
   a second front wheel, wherein the first front wheel is spaced apart from the second front wheel in the horizontal direction by a second distance,
   wherein the first distance between the first traveling wheel and the second traveling wheel is less than the second distance between the first front wheel and the second front wheel.

2. The robot according to claim 1, wherein at least one of the first front wheel and the rear wheel comprises an omni wheel.

3. The robot according to claim 1, wherein the first front wheel includes an omni wheel assembly, the omni wheel assembly of the first front wheel including:
   a main wheel having a rotation center axis parallel to a rotation center axis of the first traveling wheel, wherein the rotation center axis of the first traveling wheel is parallel to a rotation center axis of the second traveling wheel; and
   a plurality of barrels disposed on an outer circumference of the main wheel, the plurality of barrels rotating about a rotation center axis in a direction different from the rotation center axis of the main wheel, and
   wherein the rear wheel comprises an omni wheel assembly, the omni wheel assembly of the rear wheel including:

a main wheel having a rotation center axis parallel to the rotation center axis of the first traveling wheel; and a plurality of barrels disposed on an outer circumference of the main wheel, the plurality of barrels rotating about a rotation center axis in a direction different from the rotation center axis of the main wheel.

4. The robot according to claim 3, wherein the second front wheel includes an omni wheel assembly, the omni wheel assembly of the second front wheel including:

a main wheel having a rotation center axis parallel to the rotation center axis of the second traveling wheel; and a plurality of barrels disposed on an outer circumference of the main wheel, the plurality of barrels rotating about a rotation center axis in a direction different from the rotation center axis of the main wheel.

5. The robot according to claim 1, wherein a distance between a first virtual line, which equally divides the main body in the horizontal direction, and at least one of the first traveling wheel or the second traveling wheel, is greater than a distance between at least one of the first traveling wheel or the second traveling wheel and a side end of the main body.

6. The robot according to claim 5, wherein the rear wheel is disposed between a second virtual line, which equally divides the main body in a longitudinal direction, and the rear end of the main body, and wherein the longitudinal direction is perpendicular to the horizontal direction and the vertical direction.

7. A robot, comprising:

a main body having a front end and a rear end, the main body including:

a first traveling wheel;

a second traveling wheel, the second traveling wheel being spaced apart from the first traveling wheel by a first distance in a horizontal direction; and a rear wheel, the rear wheel being positioned closer to the rear end of the main body than both of the first traveling wheel and the second traveling wheel;

a seating body disposed above the main body in a vertical direction, the vertical direction being perpendicular to the horizontal direction; and a foot supporter disposed on a lower portion of the front end of the main body, the foot supporter including a first front wheel, wherein a distance between a first virtual line, which equally divides the main body in the horizontal direction, and at least one of the first traveling wheel or the second traveling wheel, is greater than a distance between at least one of the first traveling wheel or the second traveling wheel and a side end of the main body, and wherein the rear wheel is disposed on the first virtual line that equally divides the main body in the horizontal direction.

8. A robot, comprising:

a main body having a front end and a rear end, the main body including:

a first traveling wheel;

a second traveling wheel, the second traveling wheel being spaced apart from the first traveling wheel by a first distance in a horizontal direction; and a rear wheel, the rear wheel being positioned closer to the rear end of the main body than both of the first traveling wheel and the second traveling wheel;

a seating body disposed above the main body in a vertical direction, the vertical direction being perpendicular to the horizontal direction; and a foot supporter disposed on a lower portion of the front end of the main body, the foot supporter including a first front wheel, wherein the main body further includes a lower plate connected to the foot supporter, wherein the lower plate is configured to guide the foot supporter in a longitudinal direction, the longitudinal direction being perpendicular to the horizontal direction and the vertical direction, and wherein the rear wheel is rotatably connected to the lower plate.

9. The robot according to claim 8, wherein the foot supporter includes a guide body extending along a length of the foot supporter, and wherein the lower plate includes a guide rail, the guide rail guiding the guide body of the foot supporter along the longitudinal direction.

10. The robot according to claim 8, wherein the lower plate includes a first through-hole and a second through-hole, wherein the first traveling wheel is disposed in the first through-hole of the lower plate, and wherein the second traveling wheel is disposed in the second through-hole of the lower plate.

11. The robot according to claim 8, further comprising:

a foot supporter mover disposed on the lower plate, the foot supporter mover being configured to move the foot supporter in the longitudinal direction;

a first traveling motor configured to drive the first traveling wheel;

a second traveling motor configured to drive the second traveling wheel; and a processor configured to control the foot supporter mover, the first traveling motor and the second traveling motor.

12. The robot according to claim 11, wherein the foot supporter mover includes:

a foot supporter motor mounted on the lower plate;

a screw connected to the foot supporter motor, the screw being configured to rotate in response to rotation of the foot supporter motor; and a carrier configured to move along the screw in response to rotation of the screw, the carrier being connected to the foot supporter.

13. A robot, comprising:

a main body having a front end and a rear end, the main body including:

a first traveling wheel;

a second traveling wheel, the second traveling wheel being spaced apart from the first traveling wheel by a first distance in the horizontal direction; and a rear wheel, the rear wheel being positioned closer to the rear end of the main body than both of the first traveling wheel and the second traveling wheel;

a first traveling motor configured to drive the first traveling wheel;

a second traveling motor configured to drive the second traveling wheel;

a seating body disposed above the main body in a vertical direction, the vertical direction being perpendicular to the horizontal direction;

a foot supporter disposed on a front lower portion of the main body and disposed in front of the seating body in a longitudinal direction, the longitudinal direction being perpendicular to the horizontal direction and the vertical direction, wherein the foot supporter includes:
a first front wheel; and
a second front wheel, the second front wheel being spaced apart from the first front wheel by a second distance in the horizontal direction, wherein each of the first front wheel, the second front wheel and the rear wheel is an omni wheel, wherein a rotation center of the robot is disposed between the first traveling wheel and the second traveling wheel, wherein the rear wheel is disposed on a first virtual line that equally divides the main body in the horizontal direction, and wherein the rear wheel is disposed between a second virtual line, which equally divides the main body in the longitudinal direction, and the rear end of the main body.

14. The robot according to claim 13, wherein a diameter of each of the first traveling wheel and the second traveling wheel is greater than a diameter of each of the first front wheel, the second front wheel, and the rear wheel, and wherein a thickness of each of the first traveling wheel and the second traveling wheel is less than a thickness of each of the first front wheel, the second front wheel and the rear wheel.

15. The robot according to claim 13, wherein the first distance between the first traveling wheel and the second traveling wheel is less than the second distance between the first front wheel and the second front wheel.

16. The robot according to claim 13, wherein the main body further includes a lower plate connected to the foot supporter, the lower plate being configured to guide the foot supporter in a longitudinal direction, and wherein the rear wheel is rotatably connected to the lower plate.

17. The robot according to claim 16, wherein the foot supporter includes a guide body extending along a length of the foot supporter, and wherein the lower plate includes a guide rail, the guide rail guiding the guide body along the longitudinal direction.

* * * * *